United States Patent [19]

Crane

[11] Patent Number: 5,012,467
[45] Date of Patent: Apr. 30, 1991

[54] METHOD AND APPARATUS FOR COLLISION DETECTION IN A LOCAL AREA NETWORK TRANSCEIVER

[75] Inventor: Ronald C. Crane, Mountain View, Calif.

[73] Assignee: 3Com Corporation, Santa Clara, Calif.

[21] Appl. No.: 418,080

[22] Filed: Oct. 10, 1989

[51] Int. Cl.⁵ .............................................. H04J 3/02
[52] U.S. Cl. ................................ 370/85.3; 370/85.20; 370/85.10; 340/825.5
[58] Field of Search ................... 370/85.3, 85.2, 85.1; 340/825.5

[56] References Cited

U.S. PATENT DOCUMENTS

| | | | |
|---|---|---|---|
| 4,476,467 | 10/1984 | Terwilliger et al. | 370/85.2 |
| 4,560,984 | 12/1985 | Scholl . | |
| 4,561,091 | 12/1985 | Scholl et al. . | |
| 4,562,582 | 12/1985 | Tokura et al. . | |
| 4,580,872 | 4/1986 | Bhatt et al. . | |
| 4,628,311 | 12/1986 | Milling | 370/85.3 |
| 4,727,592 | 2/1988 | Okada et al. | 370/85.2 |
| 4,751,701 | 6/1988 | Rood et al. | 370/85.3 |
| 4,776,041 | 10/1988 | Husbands . | |
| 4,945,532 | 7/1990 | Hald | 370/85.3 |

Primary Examiner—Douglas W. Olms
Assistant Examiner—Dang Ton
Attorney, Agent, or Firm—Townsend and Townsend

[57] ABSTRACT

A collision detection circuit in a network transceiver detects collision among a type of digitally-encoded signals by detecting for transitions at a timed position relative to previous transitions within a preselected time tolerance band or window. (Manchester encoding is one such binary code, which has all data divided into bit cells containing the complement of a data bit and the value of the data bit separated by a transition ideally placed in the center of the bit cell.) Absent occurrence of such a transition, a signal is generated indicative of the occurrence of a collision between signals. A typical network in which the invention is used is a broadband network or a fiber optic network, and a typical use is in a CSMA/CD (Carrier Sense Multiple Access/Collision Detection) channel as for example defined by IEEE Standard 802.3 (Ethernet).

5 Claims, 3 Drawing Sheets

METHOD AND APPARATUS FOR COLLISION DETECTION IN A LOCAL AREA NETWORK TRANSCEIVER

BACKGROUND OF THE INVENTION

This invention relates to local area network collision detection, and more specifically to collision detection in a local area network employing a medium wherein each decentralized node or each control node is given an opportunity to examine all potentially interfering signals. A typical network in which the invention is used is a carrier band network or a fiber optic network, and a typical use is in a CSMA/CD (Carrier Sense Multiple Access/Collision Detection) channel as for example defined by IEEE Standard 802.3 (Ethernet). A particular application is in a star-type optical fiber network wherein all signals are funneled through a head end.

Serial data streams in a local area network system are typically encoded in a code wherein transitions are expected at discrete times, subject to a timing window of phase tolerance. One such code is the d.c.-free binary Manchester Code specified by IEEE Standard 802.3 wherein all data is conveyed in bit cells containing the complement of the value of the data bit in the first half of the bit cell and the value of the data bit in the second half of the bit cell. Thus a transition is always expected at the center of the bit cell.

Collision detection is needed in CSMA/CD channels in order to detect interfering signals in the channel so that transmission can be halted. Collision detection in a broadband channel, as distinguished from a baseband channel where d.c. can be detected, requires special provision. In particular in a fiber optic channel, a known technique for collision detection is by means of a pulse width detector operative for detecting the edge to edge width of a received pulse. U.S. Pat. No. 4,561,091 to Scholl et al. describes such collision detection. Under certain circumstances, for example when two optically-transmitted signals of high transition rate relative to the expected pulse width collide, the collision can go undetected because the pulse width of the signals in collision may not produce adequate pulse broadening.

Still other collision detection techniques are known for fiber optic signals in a CSMA/CA network. One such technique is disclosed in U.S. Pat. No. 4,560,984 to F. W. Scholl. Therein, each transmitted signal is accompanied by a high-amplitude collision signal such that a high-amplitude threshold detector can indicate a collision by sensing presence of two such collision signals within a timed period. Nevertheless, it is frequently undesirable to provide an in-band collision detection technique which relies on additional signals.

Other patents address collision detection in optical networks. U.S. Pat. No. 4,776,041 to C. R. Husbands describes a collision detection apparatus in a star network. U.S. Pat. No. 4,562,582 to Tokura et al. describes an AC-coupled CSMA/CD system using a partial response circuit wherein the collision decision is based on detected code-rule violations of the Manchester Code. U.S. Pat. No. 4,582,872 to Bhatt et al. describes an optical collision detection scheme utilizing taps at each transceiver to divert signals to a single multiple channel optical receiver.

An in-band collision detection scheme is needed which minimizes false indication of collisions (no collision, but indication is present) and missed collisions (failure to indicate a collision).

SUMMARY OF THE INVENTION

According to the invention, a collision detection circuit in a network transceiver detects collisions among digital signals encoded in a binary code having all data divided into bit cells containing the complement of a data bit and the value of the data bit separated by a transition ideally placed in the center of the bit cell by detecting for transitions at a timed position relative to previous transitions within a preselected time tolerance band or window. Absent occurrence of such a transition, a signal is generated indicative of the occurrence of a collision between signals. The invention is primarily applicable to collision detection in a transceiver in a local area network wherein each decision-making unit, whether a control node or an autonomous transceiving node, is given an opportunity to examine in real time all transmitted and potentially interfering signals on the medium. A typical network in which the invention is used is a carrier band network or a fiber optic network, and a typical use is in a CSMA/CD (Carrier Sense Multiple Access/Collision Detection) channel as for example defined by IEEE Standard 802.3 (Ethernet).

The invention is an improvement over state machine collision detectors because it allows for finer time resolution without the use of expensive high-speed clocks. The invention will be better understood by reference to the following detailed description taken in connection with the accompanying drawings.

DESCRIPTION OF SPECIFIC EMBODIMENTS

Figure 1:
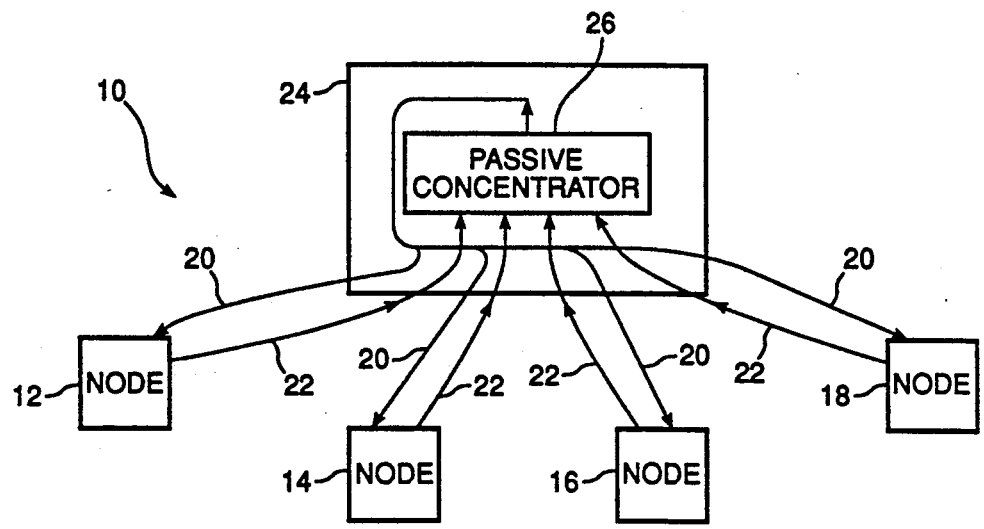
FIG. 1 is a simplified block diagram of an optical star network in which the invention may be used.

Referring to FIG. 1, there is shown a first block diagram in accordance with the invention. FIG. 1 illustrates the logical organization of a fiber optic network 10 incorporating the invention.

The network 10 comprises for example a plurality of nodes 12, 14, 16, 18, coupled by two-way optic connections 20, 22 to a head end 24. The first optical connection 20 is for receiving signals from the head end 24, and the second optical connection 22 is for transmitting optical signals to the head end 24. In the specific embodiment shown, the head end 24 is a passive device which receives signals through the optical connections 22 into a passive concentrator 26 which combines all signals into a single optical channel and reroutes the combined signals to all of the nodes 12, 14, 16, 18 through the first optical channel 20 to each node. In this manner, each of the nodes is provided with a signal representing not only its own transmitted signal, but signals from all other nodes in the network. Therefore, decision logic at the individual nodes can be used to make decisions regarding the transmission of data from that node.

Figure 2:
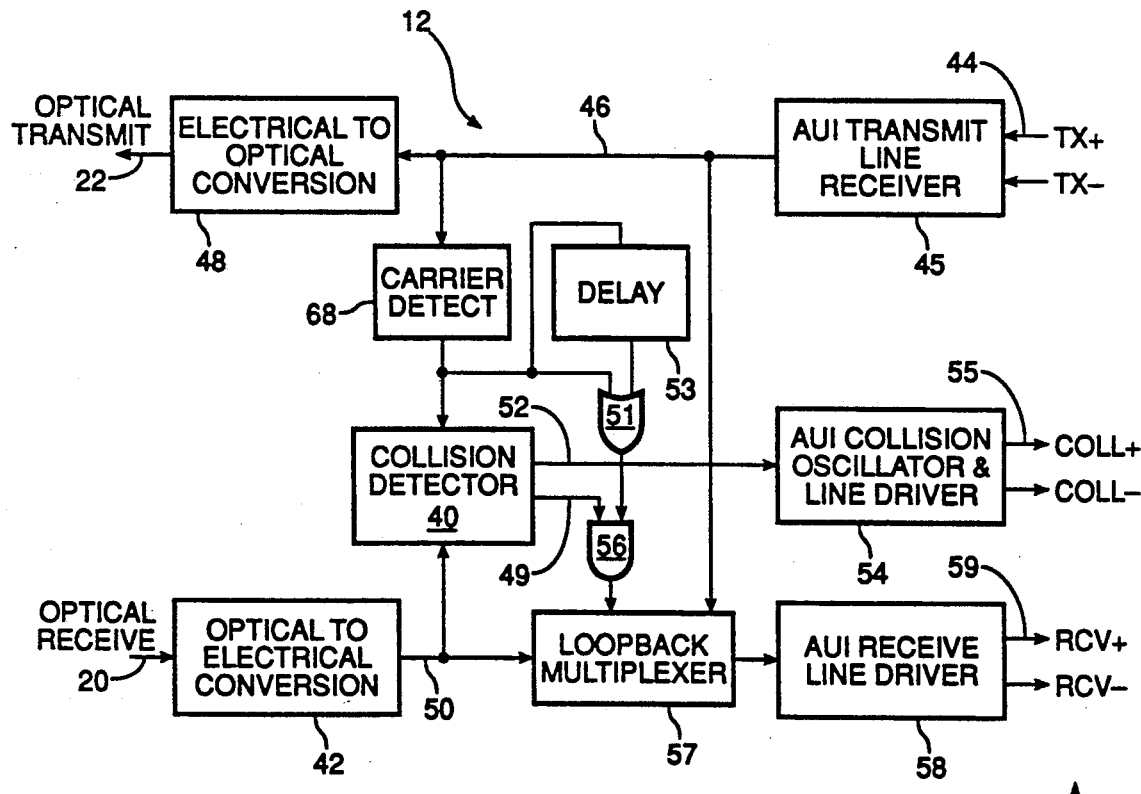
FIG. 2 is a first block diagram showing an apparatus according to the invention in a fiber optic transceiver.

Collisions are detected by a collision detector 40 according to the invention which is incorporated into each node 12, as shown in FIG. 2. The collision detector 40, which in the specific embodiment is part of a fiber optic transceiver, monitors the electrical signal received at the node 12 through an optical to electrical converter 42 from optical line 20.

The transceiver 12 has two optical connections; transmit, 22, and receive, 20, and 3 electrical connections; transmit 44, collision detect 55, and receive 59. The transceiver converts signals from the electrical port into signals for the optical port and vice-versa. Differential transmit signal 44 is received by the transmit line receiver 45 and converted into an internal transmit signal 46. The internal transmit signal 46 drives the output electrical to optical conversion 48 which drives the optical transmit port 22. The internal transmit signal 46 also drives a carrier detect circuit which produces a constant carrier detect output 68 whenever there is transmit signal activity on 46. The transmit carrier detect output 68 is used as an input to collision detector 40 and indirectly as an input to AND gate 56 whose output controls loopback multiplexer 57. During transmission, the loopback multiplexer 57 blocks the optical receive signal 50 and instead substitutes the transmit signal 46 as the input to the receive line driver 58. This prevents the round trip delay through hub (sum of delays through elements 22, 24, and 20) from being visible at electrical receive port 59 when the transceiver 12 is transmitting without a collision. The delay element 53 extends the carrier detect signal after the end of a transmission by an amount equal to the maximum round trip delay through the hub 24. The OR gate 51 combines the delayed signal with the carrier signal 68 so the multiplexer 57 is set to loopback starting with the beginning of a transmission and continuing past the end of a transmission for a time equal to the maximum round trip delay through the hub. If another station is transmitting during a transmission, it is detected by the collision detector 40 and indicated by a logic 0 signal on the collision detect line 49 which disables the loopback multiplexer 57. A collision/carrier detect signal 52 causes the collision oscillator and line driver 54 to be activated, thus driving collision signal 55. The collision/carrier detect signal is derived from a time limited version of signal 49 and a steady-state carrier detector.

From the optical receive port 20, the optical to electrical signal conversion 42 is performed resulting in electrical signal 50. The electrical receive signal, 50, is fed to the receive port, 59, on the transceiver, 12, through a multiplexer, 57, and a line driver 58. The receive signal 50 is also an input to the collision detector 40.

Figure 3:
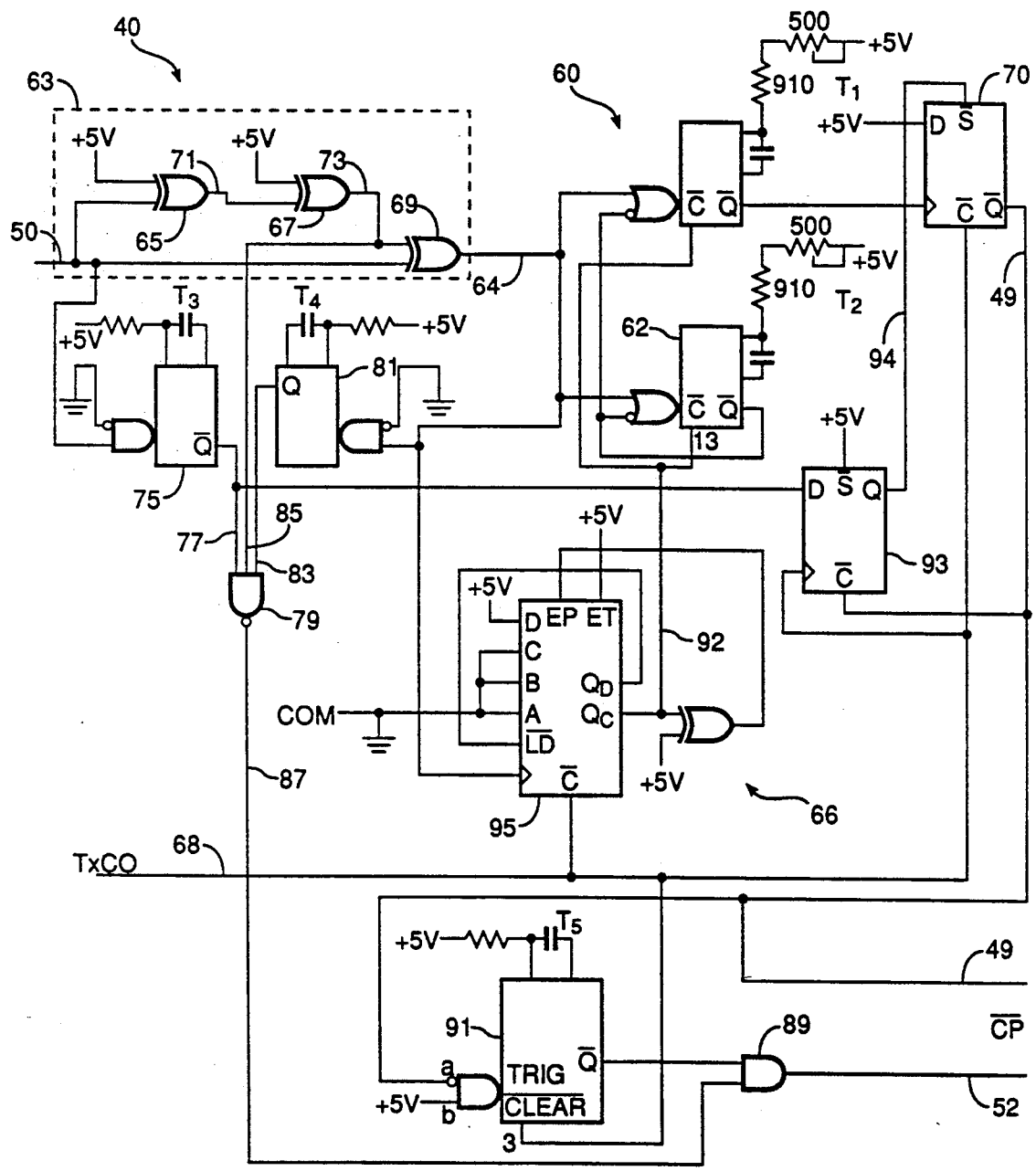
FIG. 3 is a schematic diagram of a circuit according to the invention.

FIG. 3 shows an embodiment of the collision detector circuit 40. A protected collision detect output 52 comes on if 1) the transceiver 12 is already receiving and the transmit signal becomes active, 2) when there is excessive received phase jitter while transmitting, or 3) when optical carrier is present with no transitions for greater than T3 (300 ns) and less than T4 (1100 ns). It ceases when a component of the collision condition (transmit carrier line 68) ends or when 32 μs have elapsed from the beginning of the collision, whichever occurs first. Note that the collision/carrier indication 52 can occur without the transmitter being enabled in the case of a continuous non-zero optical carrier with no transitions for more than 300 ns and less than 1100 ns. The purpose of the upper 1100 ns limit is to limit false indications in the event that the hysteresis latch in the optical receiver is left in the wrong state after a collision.

In accordance with the invention, collision detection does not require an examination of any portion of the signal other than the information-bearing portion, i.e., it does not require a sensing of the d.c. level. Thus, the invention may be used with any d.c.-free or quasi-d.c.-free signal, such as produced in a broadband medium, carrier band medium or in a fiber optic medium. In order to do so, the collision detector 40 tests for integrity of the signal by testing for a transition at a timed position relative to previous transitions within a preselected time tolerance band or window. Absent occurrence of such a transition, a signal is generated indicative of the occurrence of a collision between signals.

FIG. 3 is a schematic diagram of a collision detector circuit 40 in which the present invention is embodied. The collision detector circuit 40 comprises a first retriggerable pulse generator 60 with a delay T1 (112 ns nominal bit cell time plus ½ of window width), a second retriggerable pulse generator 62 with delay T2 (88 ns nominal bit cell time minus ½ of window width) coupled to receive an input signal from a common signal input node 64 and each driven by an exclusive-OR pulse generator 63 whose output is 64 and input is 50. The exclusive-OR pulse generator 63 is formed by first, second and third exclusive-OR gates 65, 67 and 69. The first and second exclusive-OR gates 65, 67 have one input tied to a fixed logic ONE (5 Volt) reference. The second input of the first exclusive-OR gate 65 is coupled to the input 50, and the second input of the second exclusive-OR gate 67 is coupled to output 71 of the first exclusive-OR gate 65. The output 73 of the second exclusive-OR gate 67 is thus a two-gate delayed representation of the input signal at input 50 of about 15–20 ns (two gate delays). Signals from output 73 and input 50 thus cause a 15–20 ns pulse at output 64 of the third exclusive-OR gate 69.

A third retriggerable pulse generator 75 is coupled to receive as input the input signal on line 50 and to produce an output pulse at a first input 77 of a NAND gate 79 at a pulse width T3 (300 ns—about three times the nominal bit cell period). A fourth retriggerable pulse generator 81 is coupled to receive as input the output signal on output 64 and to produce an output pulse at a second input 83 of NAND gate 79 at a pulse width T4 (1100 ns—about eleven times the nominal bit cell period). Pulse widths T3 and T4 have been explained previously. A two-gate delayed signal is applied at a third input 85 of NAND gate 79. The output of NAND gate 79 is activated to provide and output signal on line 87 if the optical signal stays on longer than T3 (300 ns), a "stuck on" state. Line 87 is coupled to one input of an output AND gate 89. The other input of output AND gate 89 is coupled to receive a signal from a fifth retriggerable pulse generator 91. Fifth retriggerable pulse generator 91 is driven by the direct output 49 of D-flip-flop 70 and has a pulse width T5 of about 32 μs.

The output signal at of the collision detector circuit 40 is derived from the output of a D-flip flop 70 which produces a "collision detected" signal on signal line 52. This condition occurs only if a transition is not detected during the bit detection window C between the termination of the second timed pulse B of the second retriggerable pulse generator 62 and the first timed pulse A of the first retriggerable pulse generator 60. The fifth retriggerable pulse generator 91 and the AND gate 89 provide protection to prevent the collision indication from persisting, which is particularly important if the transceiver 12 is connected as part of a repeater.

A further collision detect mechanism is embodied in a second flip-flop 93 whose data input is coupled to input 77, whose strobe input is taken from the transmit carrier detect line 68 and whose reset input is taken from output 49. Its output 94 is used to set the first flip-flop 70. The purpose is to look for the receive carrier in the ON state when the very first bits are transmitted at the beginning of transmission.

A holdoff circuit 66 uses a counter 95 to inhibit the collision detection circuit 40 for several bit times to accommodate extra phase distortion that may be present at the beginning of transmission. Its counter output 92 is used to clear the first and second retriggerable pulse generators 60 and 62.

Thus there are three mechanisms for collision detection: Phase jitter detection, collision detection at start of transmission, and optical carrier for an excessive amount of time independent of signal transmission.

Figure 4:
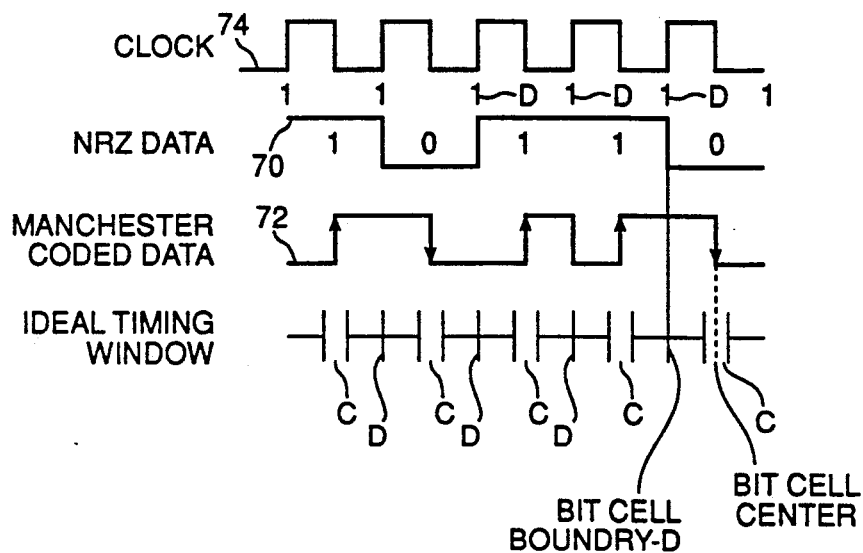
FIG. 4 is a timing diagram for illustrating Manchester coding rules and location of ideal timing windows.
Figure 5:
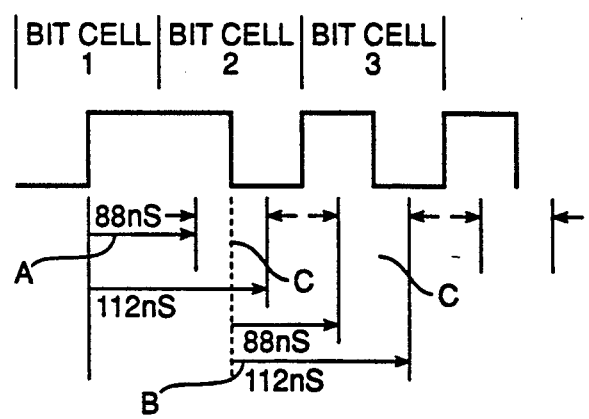
FIG. 5 is a timing diagram illustrating the generation of a timing window using retriggerable pulse generators.

Referring now to FIGS. 4 and 5, in a specific embodiment, the first pulse A has a duration of 88 ns and the second pulse B has a duration of 112.5 ns, wherein the encoded signal is a Manchester code which mandates that there must be a transition at each bit cell window. Since the retriggerable pulse generators 60 and 62 are set to trigger from a bit transition of received data, any false transition causing a trigger or any masking of a center transition will cause a misplacement of the bit detection window C, and more importantly any collision between competing signals will cause the transition relative to an accurately-placed bit detection window C to skew and thus be missed. The circuit senses this lost transition and issues its collision detect signal.

FIG. 4 illustrates the relationship of NRZ encoded signal 70 and a corresponding Manchester (d.c.-free) encoded signal 72 relative to a clock signal 74 and bit detection windows C. Since transitions are expected at the center of every bit cell, and in accordance with the invention within every one of the bit detection windows C (transitions at the bit cell boundaries D are optional so that the sense of transition can be reversed to provide the detectable information), any absence of a bit transition in a bit transition window C is sufficient to indicate a collision in a Manchester encoded signal.

The invention has now been explained with reference to specific embodiments. Other embodiments will now be apparent to those of ordinary skill in the art in light of the specification. It is therefore not intended that the invention be limited, excepted as indicated by the appended claims.

What is claimed is:

1. A method for detecting collisions of packets of Manchester coded binary data comprising:

preselecting a period of time between expected transitions of a Manchester coded binary data signal to serve as a timing window;

transmitting a Manchester coded binary data signal, each said Manchester coded binary data signal having a transition at a repetitive expected time interval relative to a previous transition;

receiving said Manchester coded binary data signal; and producing a packet collision signal whenever said transitions of said Manchester coded binary data fail to appear during said timing window.

2. An apparatus for detecting collisions of packets of Manchester coded binary data wherein a Manchester coded binary data signal is transmitted, each said Manchester coded binary data signal having a transition at an expected time interval relative to a previous transition, said apparatus comprising:

means defining a preselected period of time between expected transitions of a Manchester coded binary data signal for serving as a timing window;

means for receiving said Manchester coded binary data signal; and means for producing a packet collision signal whenever said transition of said Manchester coded binary data fail to appear within said timing window.

3. The apparatus of claim 2 wherein;

said Manchester coded binary data signal is an optical signal transmitted as a modulated optical signal over an optical transmission medium; and said receiving means comprises means for receiving a modulated electrical signal converted from said modulated optical signal.

4. The apparatus of claim 3 wherein said receiver further comprises:

a threshold detector which receives said electrical signal, said threshold detector generating a first signal only when a transition occurs;

a timer which receives the output of said threshold detector and generates a second signal only when said first signal occurs prior to a first preselected time or after a second preselected time relative to a prior first signal; and logic means for producing a third signal only upon occurrence of said second signal, said third signal being a collision detect signal.

5. The apparatus of claim 3 wherein said receiver further comprises:

means for phase jitter detection;

means for collision detection at start of transmission; and means for detecting presence of an optical carrier for an excessive amount of time independent of signal transmission.

* * * * *